June 17, 1930. G. F. WENTZ 1,763,732
DEVICE FOR DISPENSING LIQUIDS
Filed Dec. 2, 1925 8 Sheets-Sheet 1

Inventor
George F. Wentz

June 17, 1930.  G. F. WENTZ  1,763,732
DEVICE FOR DISPENSING LIQUIDS
Filed Dec. 2, 1925  8 Sheets-Sheet 4

June 17, 1930.  G. F. WENTZ  1,763,732
DEVICE FOR DISPENSING LIQUIDS
Filed Dec. 2, 1925  8 Sheets-Sheet 5

Witnesses
C. L. McDonald
E. N. Lovewell

Inventor
George F. Wentz
By
E. G. Siggers
Attorney

Patented June 17, 1930

1,763,732

UNITED STATES PATENT OFFICE

GEORGE FRANKLIN WENTZ, OF COLORADO SPRINGS, COLORADO

DEVICE FOR DISPENSING LIQUIDS

Application filed December 2, 1925. Serial No. 72,695.

This invention relates to a device for dispensing liquids, and particularly one of the visual type designed primarily for use in gasoline service stations.

One of the important objects of the invention is to arrange the means for filling the transparent container and discharging the same in such a manner that the container may be located no higher than the customer's eyes, so that, without inconvenience, the customer may watch the flow, and see exactly what he is getting. Incidental to this arrangement, the amount of gasoline delivered is accurately measured, and there is no possibility of loss by reason of leaky packing or valves.

Another important object is to keep an accurate check on the amount of gasoline dispensed, providing means for recording each individual sale, this being so arranged that failure to record any sale may be positively detected, and the attendant who is responsible therefor may be identified.

The device is so constituted that after a predetermined amount of gasoline has been dispensed, but not recorded, the gage may be set so as to dispense an additional quantity without refilling the glass container, but after the amount dispensed has been recorded, no more can possibly be dispensed until the container has been refilled.

Provision is also made for returning to underground storage, at the close of the day, the gasoline which is at that time in the container, at the same time making a record which proves that it was thus returned, and not otherwise disposed of.

If the attendant should register the same sale twice, this may also be detected by checking up the record tape with the meter.

The invention has the further advantage that the top casing, and the mechanism carried thereby may be removed, and the interior of the glass container cleaned without removing the same from its base.

Various other objects and advantages will be apparent from the following detailed description taken in connection with the accompanying drawings, which illustrate one practical embodiment of the invention.

The device constituting the invention is mounted on a suitable cylindrical base 1, having a top 2, which also forms the base of a transparent glass container 3. The lower end of the glass container is secured to the base in any suitable manner to prevent leakage, and an annular rim 4 is similarly secured to the top of the container, and firmly connected to the base 2 by rods 5. The inner diameter of the rim 4 is somewhat less than the diameter of the container 3, and is closed by a cover 6, which is secured to the rim 4 by suitable bolts 7, and forms a support for various instrumentalities to be hereinafter described. The cover 6 is provided with openings 8 to receive the ends of the bolts 5, and also to provide breather openings. The mechanism supported above the container 3 is enclosed by the casing 9, which is secured to the rim 4 by suitable cleats 10. The casing 9 is provided with doors 11, which may be locked to prevent unauthorized tampering with the mechanism within.

The gasoline is transferred from the underground storage tank to the transparent container 3 through a pipe 12, which extends upwardly through the base 2 and rim 4 outside of the container 3, where it is connected through a valve chamber 13 to a pipe 14 extending downwardly into the transparent container, and terminating near its bottom. The gasoline may be elevated by means of a suitable pump, either manually or automatically operated. An overflow pipe 15 extends from a point within and near the top of the container 3, downwardly into the base 1, where it is connected to a stand pipe 16, leading back to the underground storage tank. The base is provided with a door 17, which may be opened for the purpose of returning the gasoline to the storage tank through the pipe 16.

Gasoline may be dispensed from the container 3, through a pipe 18 leading from the bottom of the container, and thence upwardly alongside the same, as shown at 19, to a valve chamber 20 located above the container. A flexible dispensing hose 21 is connected to the valve chamber 20, and has a head 22 secured to its free end, and carrying a nozzle 23.

Figures 4, 5, 6, 7:
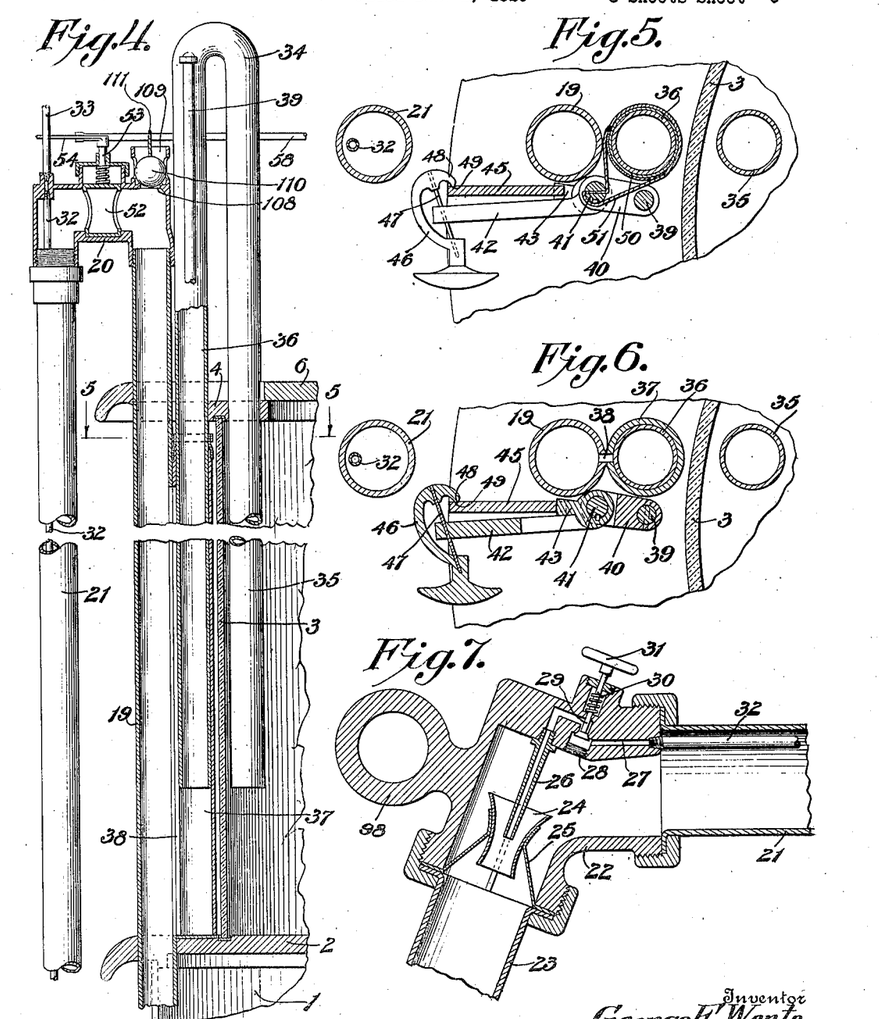
Figure 4 is a vertical section of the discharge pipe, and the means for controlling the amount of gasoline dispensed.
Figure 5 is a detail sectional view taken on the line 5—5 of Figure 4, showing, in plan, the latch mechanism associated with the gage bar.
Figure 6 is a horizontal section through the latch mechanism.
Figure 7 is a detail section taken centrally through the nozzle head.

Since the glass container 3 is to be located low enough, so as to be easily observed by the customer, other means than gravity are provided for dispensing the gasoline from the container. For this purpose, a tapered mouth 24 is supported within the head 22 by means of a spider, which is secured between the head and its connection to the nozzle 23. An ejector nozzle 26 is secured to the rear wall of the head 22, and terminates within the mouth 24. A passageway 27 is formed in the wall of the head leading to the nozzle 26, and is provided with an air chamber closed by a plug 28, and containing a valve 29 for controlling the passage of air through the nozzle 26. This valve is so arranged as to be held normally closed by a spring 30, and the stem of the valve extends outwardly from the wall of the head 22, and is provided with a button 31, which may be pressed to open the valve. The duct 27 is connected with a source of compressed air, so that the attendant, by pressing the button 31, causes compressed air to issue from the ejector nozzle 26 and create a partial vacuum within the hose 21, which will draw the gasoline from the container 3, and cause the same to be discharged through the nozzle 23. The means for supplying compressed air to the ejector, comprises a tube 32, connected at one end to the duct 27, and connected to a duct in the wall of the valve casing 20, which, in turn, may be connected by a tube 33 to the air compressor or storage tank.

The amount of gasoline dispensed is controlled by means of an adjustable U-shaped pipe 34 having one leg 35 extending down through the top of the container, and its other leg 36 telescoping within a pipe 37 mounted outside of the container. The pipe 37, as shown in Figures 4 and 6, is integrally connected to the discharge pipe 19, and is in communication therewith through a slit 38, extending from the base 2 nearly to the top of the container. Wherever the U-shaped pipe 34 is adjusted, as the gasoline is drawn from the container by the vacuum created by the action of the ejector, as soon as the level of the gasoline reaches the bottom of the leg 35, air will be admitted through the pipe 34, slot 38 and pipe 19 to destroy the vacuum created by the ejector action, and the gasoline will cease to flow. For adjusting the U-shaped pipe 34, a rod 39 is connected to the leg 36, and has an ear 40 secured to its lower end, and adapted to slide on a rod 41 which is mounted for rocking movement in the rim 4 and base 2, respectively. A latch lever 42 is splined to the rod 41, and engages the ear 40, so as to cause the rod 39 and pipe 34 to move up or down with the lever 42 as the latter slides on the rod 41. The latch lever has a lug 43 formed thereon, which is adapted to engage in one of the notches 44 formed on a gage bar 45 secured alongside the rod 41. This gage bar is so calibrated that the distance on centers between two adjacent notches represents one quart of gasoline. A dog 46 is supported on the end of the latch lever 42 by means of a resilient stem 47, and this dog has a hook-shaped end 48 which is adapted to engage a groove 49 formed in the rear face of the gage bar to lock the lug 43 in engagement with the notch representing the amount of gasoline to be dispensed. By swinging the dog 46 outwardly, however, the lever 42 may be easily released so as to disengage the lug 43 from the notch for the purpose of adjusting the pipe 34 up or down.

In order to make the connection between the leg 36 and the pipe 37 air tight, the latter is provided at its upper end with a flexible sleeve 50, and an elastic band 51 secured to the upper end of the rod 41 engages the sleeve 50, and as the latch lever 42 is swung to locking position as shown in Figure 5, the band 51 is stretched tight and presses the sleeve 50 tightly against the pipe 36. When, however, the latch lever 42 is swung forwardly to disengage the lug 43 from the notch, the sleeve 50 is also released to permit the pipe 34 to be adjusted.

Figure 8:
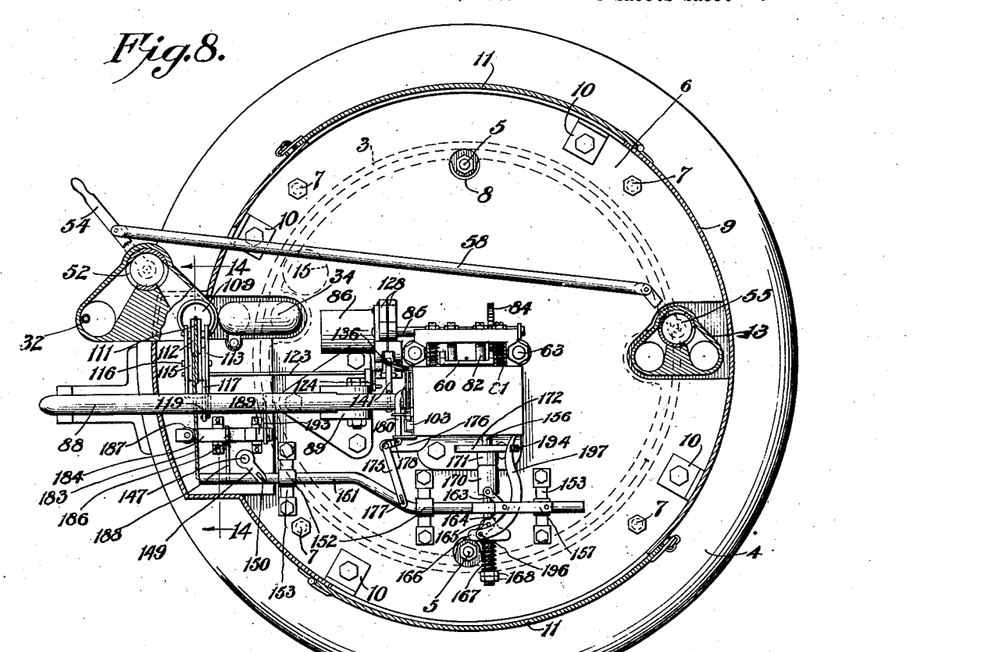
Figure 8 is a plan view with parts of the casing removed.
Figure 9:
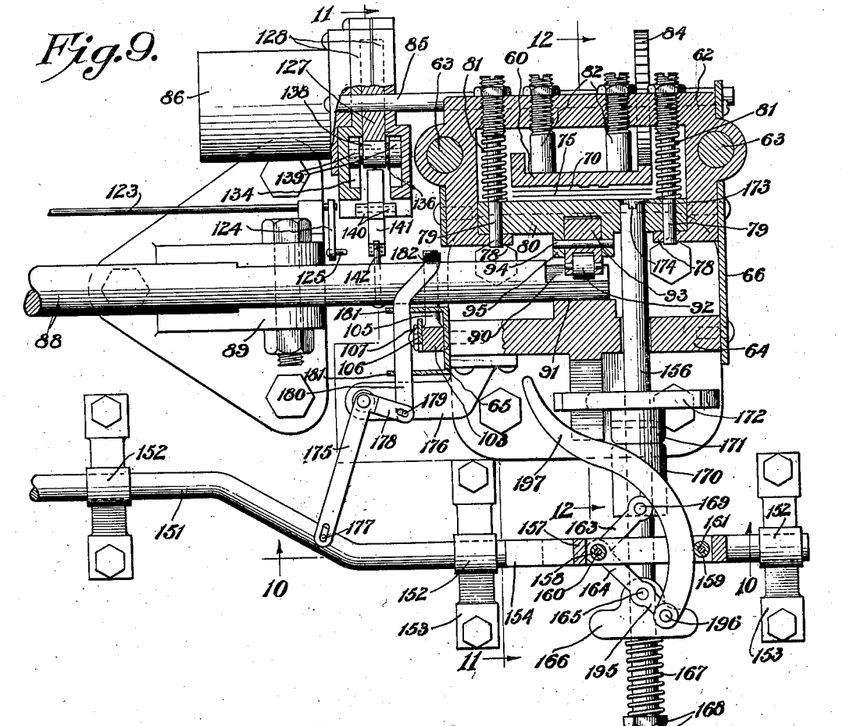
Figure 9 is a horizontal section through the recording mechanism.

A rotary outlet valve 52 is seated in the valve box 20, and has a stem 53 to which is secured a lever 54. An inlet valve 55, similar to the valve 52, is seated in the valve box 13, and has a stem 56 to which is secured a lever 57. The levers 54 and 57 are connected by a link 58 in such relation that when the outlet valve 52 is open, as shown in Figure 8, the inlet valve 55 is closed, and when the inlet valve is open the outlet valve is closed. One of the levers, as 54, may be actuated manually to shift the valves, or if an automatic pump is used for elevating the gasoline and filling the container 3, this pump may be connected to the link 58 or one of the valve actuating levers, so that the latter will be shifted automatically.

A float 59 is located within the container 3, and is formed with peripheral recesses for receiving the pipes and rods which extend within the container, whereby the float is guided as it rises and falls with the liquid in the container. A bar 60 is secured to the float, and extends vertically upwardly through a slot 61 in the cover 6, whereby the bar is guided vertically up or down. The upper end of the bar 60 extends through a frame 62, which is supported by studs 63 from the cover 6. A bracket 64 is secured to the cover 6 in front of the bar 60, and in spaced relation to the frame 62. Side plates 65 and 66 are secured to the frame 62 and bracket 64, and at their upper ends are integrally connected by a top plate 67. A roller 68 is rotatably mounted in a bearing bracket 69 secured to the inner side of the bracket 64, and in front of the bar 60. The roller 68 is adapted to carry an inking ribbon 70, which extends from the roller 68 up through the frame 62 to a take-up roller 71 secured to a shaft 72 journaled between the side plates 65 and 66. A roller 73, rotatably mounted above the roller 68 in a bracket 74 secured to the inner face of the bracket 64, is adapted to carry a record tape 75, which extends upwardly through the frame 62 in front of the inking ribbon 70 to a take-up roller 76, which is secured to a shaft 77 journaled between the side plates 65 and 66 below the roller 71.

The frame 62 is formed at its front side with inturned flanges 78, and connecting these flanges to the rear side of the frame are studs 79 on which a platen 80 is slidably mounted in front of the record tape, and is normally held seated against the flanges 78 by expansile coiled springs 81, which surround the studs. The front face of the bar 60 is provided with a series of embossed numbers, so arranged that wherever the float may be, the number which is underneath the platen 80 will denote the number of gallons which the container 3 lacks of being full, or in other words, the number of gallons which have been dispensed from the container. Abutment studs 82 are secured to the frame 62 behind the bar 60, so that the bar is rigidly supported when the platen is advanced to imprint upon the tape 75 the number of gallons which have been dispensed.

The bar 60 is also provided on its rear face with a rack 83, which meshes with a pinion 84 secured to a shaft 85 journaled at the rear side of the frame 62. One end of the shaft 85 extends into a casing 86, which is supported on a bracket 87 and contains a meter for registering the number of gallons which are withdrawn.

Figure 12:
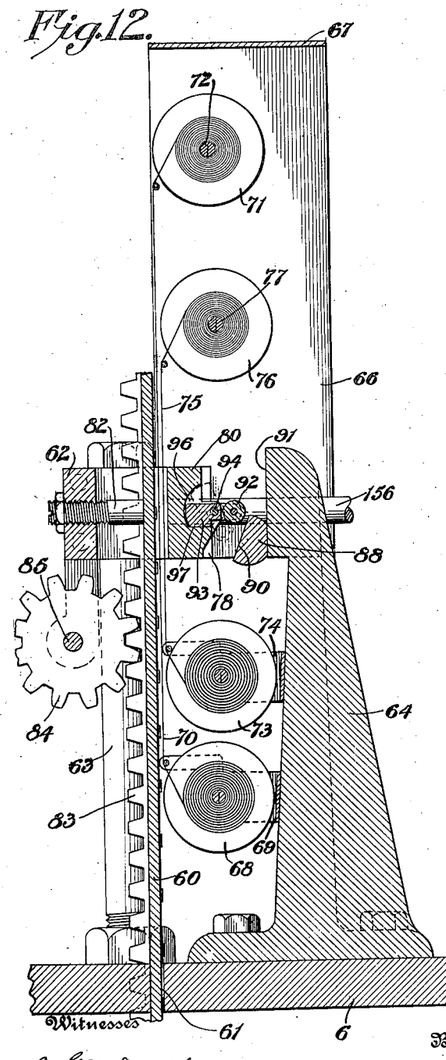
Figure 12 is a section taken substantially on the line 12—12 of Figure 9.

The numbers on the front face of the bar 60 are for the purpose of recording on the tape 75 the number of gallons involved in each individual sale. For making this record, the platen 80 is advanced after each sale, and before the container 3 is refilled. This printing operation is effected by pulling downwardly the outer end of the main lever 88, which is intermediately pivoted in a bracket 89 secured to the cover 6. The inner end of this lever has a bevelled surface 90, which as the outer end of the lever is pulled down, rides upwardly between a flat surface 91 of the bracket 64 and a roller 92 mounted in the front end of a member 93, which is intermediately pivoted on a pin 94 between ears 95 formed on the back of the platen 80. The inner end of the member 93 extends into a recess 96 formed in the back of the platen 80, and normally rests by gravity on a flat lower face 97 of the recess. As the bevelled end 90 of the lever rides upwardly between the flat face 91 and the roller 92, therefore, the platen is advanced so as to print upon the tape the number which is adjacent the same upon the bar 60, but when the lever is returned, the roller 92 will swing downwardly, as indicated by dotted lines in Figure 12, permitting the bevelled end of the lever to pass downwardly without advancing the platen.

Figure 1:
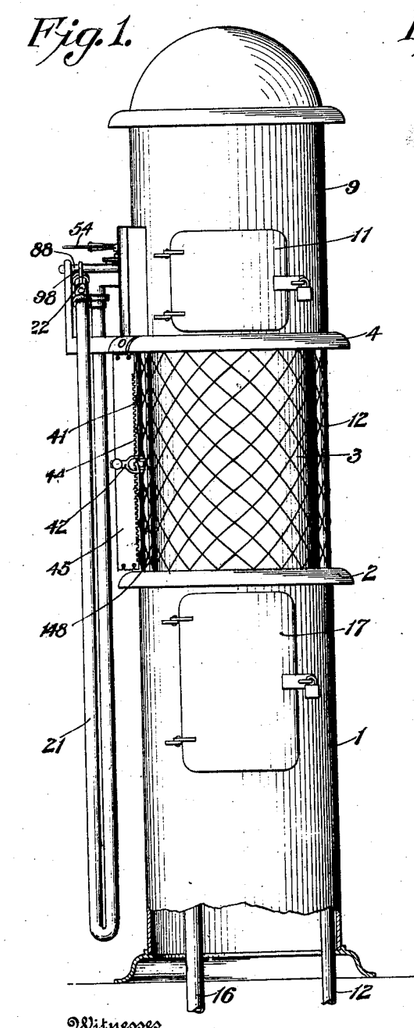
Figure 1 is a front elevation of the invention.
Figure 2:
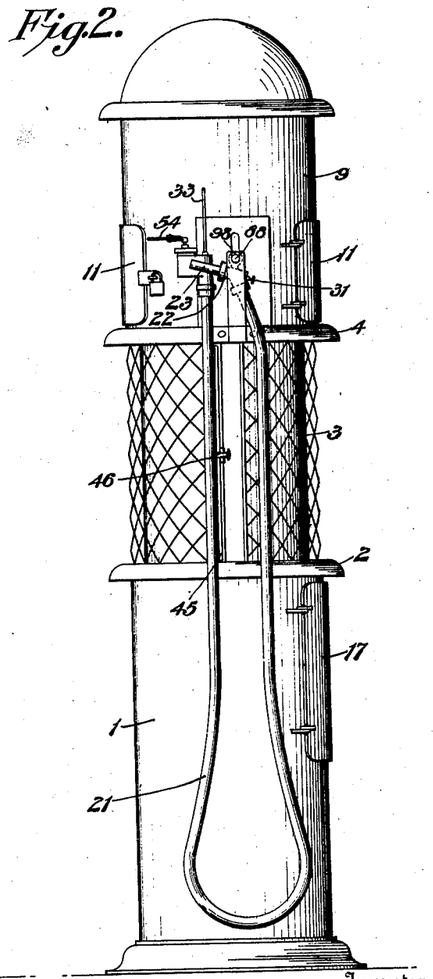
Figure 2 is a side elevation.
Figure 3:
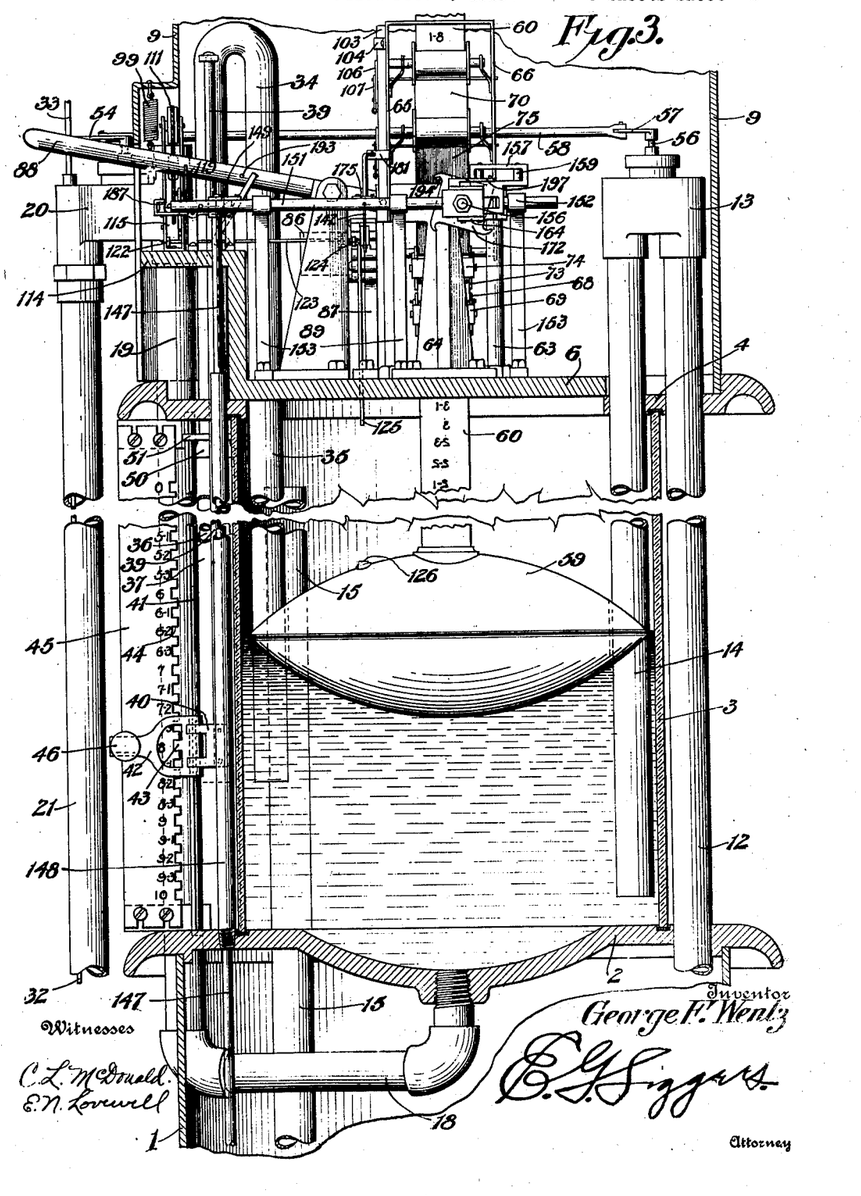
Figure 3 is a vertical central section with parts broken away.

Ordinarily, the movement of the lever 88 for recording upon the tape the sale which has been completed will be effected by the weight of the hose, when the latter is hung up after the gasoline has been dispensed, but before the container 3 has been refilled. For this purpose, the head 22 of the dispensing nozzle is provided with an eye 98, by means of which the hose is hung upon the end of the lever 88. The container 3 should now be refilled before the hose is again removed from the lever. As soon as the hose is taken down, the lever is returned to its normal position by a coil spring 99, as shown in Figure 3.

Provision is made for advancing the take-up rollers 71 and 76 after each sale has been recorded. For this purpose, each of the shafts 72 and 77 is extended through the side plate 65, and has secured to its outer end a ratchet wheel 100. A pawl 101, pivoted to the plate 65, is adapted to be held by a spring 102 in engagement with the teeth of the ratchet to prevent retrograde movement thereof. A slide bar 103 is mounted in a keeper 104 adjacent the ratchet wheels 100, and at its lower end has a laterally extending stud 105 to which the inner end of the lever 88 is pivoted. Pawls 106, pivotally mounted on the slide bar 103, are adapted to be urged into engagement with the teeth of the respective ratchet wheels by springs 107. When the lever 88 is returned, therefore, after recording a sale, the slide bar 103 is drawn downwardly, and through the medium of the pawls 106 engaging the ratchet teeth, the take-up rolls are advanced.

As soon as the outer end of the lever 88 is moved downwardly to record a sale, the vacuum in the discharge pipe 19 is broken, and no more gasoline can be dispensed until the container 3 has been refilled. For bringing about this condition, the outlet valve box 20 has a port 108, surrounding which is a valve pocket 109 for receiving a ball valve 110 which normally closes the port 108. A cord or cable 111 is secured at one end to the ball valve 110, and extends thence upwardly over a sheave 112 mounted at the upper end of the bracket 113, which is secured to a raised portion 114 of the cover 6. The other end of the cable 111 is secured to a sheave 115, secured on a shaft 116 which is journaled in the lower part of the bracket 113. An arm 117 is loosely mounted at one end on the shaft 116, and at its outer end is provided with a slot 118 which receives the end of a finger 119 secured to the lever 88. When the outer end of the lever 88 is depressed, therefore, the arm 117 is swung downwardly to the position shown in dotted lines in Figure 14. In doing this, the arm 117, acting against the pin 120 on the sheave 115, rocks the latter, draws the end of the cable 111 downwardly, and raises the valve 110 to open the port 108 and relieve the vacuum in the discharge pipe. The sheave 115 is provided on its lower side with a shoulder 121, which is adapted to be engaged by a latch finger 122 to lock the valve 110 in open position until the latch finger 122 is released. This latch finger is secured to a shaft 123, which is journaled in the bracket 113 and in an ear formed on the bracket 89. An arm 124, secured to the inner end of the shaft 123, has a rod 125 pivotally connected thereto, which extends downwardly into the upper part of the container 3. The float 59 has an abutment 126 thereon, which, as soon as the container is refilled, engages the lower end of the rod 125, raising the same and rocking the shaft 123 to release the latch finger 122 from the shoulder 121, and permit the valve 110 to close. Until the container 3 is refilled, however, the weight of the rod 125 holds the finger 122 in latching position.

If the container is refilled without recording the last sale, the take-up roller 76 will nevertheless be advanced, and the tape 75, therefore, will show a blank space where the sale should have been recorded. For effecting this result, a cam disk 127 is secured to the shaft 85 within a housing formed by two plates 128 secured at the inner end of the meter casing 86. The greater portion of the periphery of the disk 127 is concentric with the shaft 85, and at one end of this concentric portion is a concave notch 129 cut in at a sharp angle, and merging into a convex portion 130 which merges into the other end of the concentric portion. The inner edges of the plates 128 are offset from each other to form a slot 131, adjacent to which is a pocket 132 formed by opposed recesses in the inner faces of the plates, each recess having an upper notch 133 and a lower notch 134 separated by a tongue 135. A ratchet bar 136 extends through the slot 131, and its upper end is slidably mounted in a keeper 137 secured to the plate 65 below one edge of the lower ratchet wheel 100. The lower end of the ratchet bar 136 has a roller 138 mounted centrally thereof, and adapted to be engaged by the periphery of the cam disk 127, and at each end of the roller 138 is a roller 139 adapted to ride within the corresponding recess 132. During the dispensing operation, the cam disk 127 will be rotated to the right, as viewed in Figure 11, and the rollers 139 will be carried into the notches 134. The relation of the pinion 84 and rack 83 with respect to the float 59 is such that no matter what notch the lug 43 engages, the cam disk 127 will always come to rest with its concentric portion in engagement with the roller 138, so that the rollers 139 will be left in the notches 134. The plates 128 are formed with ears 140 projecting beyond the slot 131, and a dog 141, pivoted between these ears, is connected by a link 142 to the lever 88 near its inner end. When the outer end of the lever is depressed, therefore, to record the last sale, the link 142 will be lifted, and the curved inner end of the dog 141 will engage the roller 138, and hold the latter out of the path of the notch 129 as long as the lever 88 remains in this position. During this time, the container 3 may be refilled without advancing the take-up roll 76. The latter, however, will be advanced as soon as the lever 88 is released. If the container is refilled, however, without recording the last sale, the dog 141 will remain in the position shown in Figure 11, and as the float 59 rises, the cam 127 being rotated to the left, the notch 129 will engage the roller 138 and carry the same upwardly past the tongue 135. The rollers 139, then engaging the inner side of the pocket 132, will be carried into the upper notches 133 as the cam disk advances, and the upper end of the ratchet bar 136 will engage a tooth of the ratchet 100 to advance the take-up roll 76, although the last sale has not been recorded. A blank space will, therefore, be left on the tape 75. As each subsequent rotation of the cam disk 127, during the refilling operation, the convex portion 130 of the cam will prevent the roller 138 from dropping downwardly past the tongue 135, so that although there may be many revolutions of the cam disk before the container 3 is completely refilled, the take-up roll will be advanced only one space.

Figure 17:
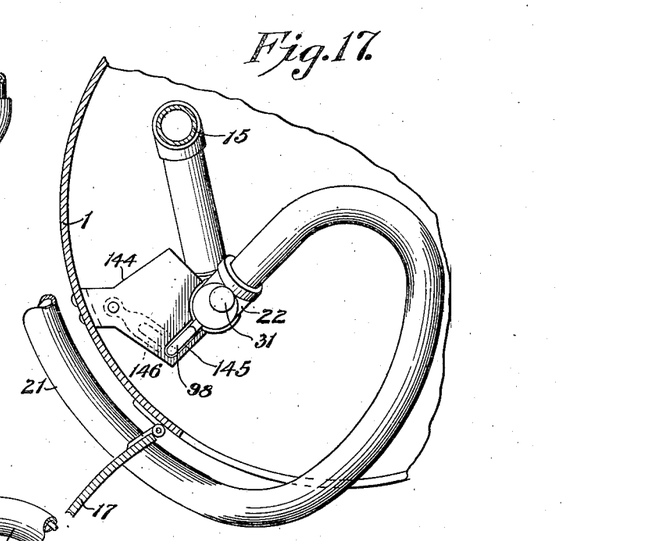
Figure 17 is a detail sectional view taken substantially on the line 17—17 of Figure 16, illustrating the initial step of inserting the nozzle for returning the gasoline to underground storage.
Figure 18:
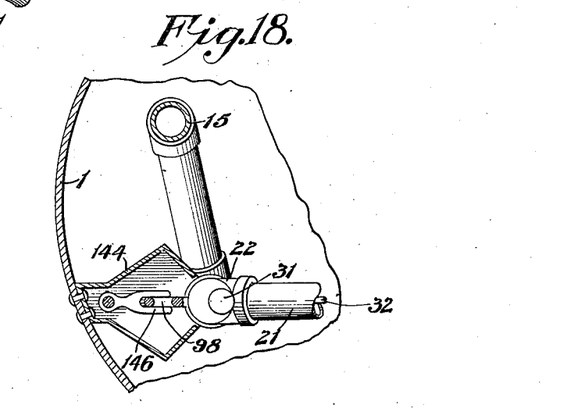
Figure 18 is a section taken substantially on the line 18—18 of Figure 16.

When, at the close of the day, it is desired to return the contents of the container 3 to underground storage, the door 17 is opened, and the nozzle 23 inserted in the open end of the stand pipe 16. The latter has a collar 143 secured to its upper end, and connected with the collar is a housing 144, which is secured to the inside of the base 1. A slot 145 is provided in the upper wall of the housing through which the eye 98 may be inserted, as shown in Figure 17. The nozzle is then turned toward the right, so that the eye 98 engages a forked arm 146, and swings the latter also to the right, rocking the vertical rod 147, to the lower end of which the arm 146 is secured. The rod 147 is journaled at its lower end in the bottom wall of the housing 144, and extends upwardly through a pipe 148, which is secured to the top 2 of the base, and to the rim 4 just outside the container 3. The upper end of the rod 147 projects through the raised portion 114 of the cover, and has a laterally extending arm 149 secured to its upper end. This arm has a slotted connection with a pin 150 secured on a bar 151, which is slidably mounted in sleeves 152 formed at the upper ends of brackets 153, which are secured to the cover 6. As the nozzle 23 is inserted in the stand pipe 16, therefore, and turned to the right, the slide bar 151 is advanced to the right, as viewed in Figures 8 and 9.

Figure 10:
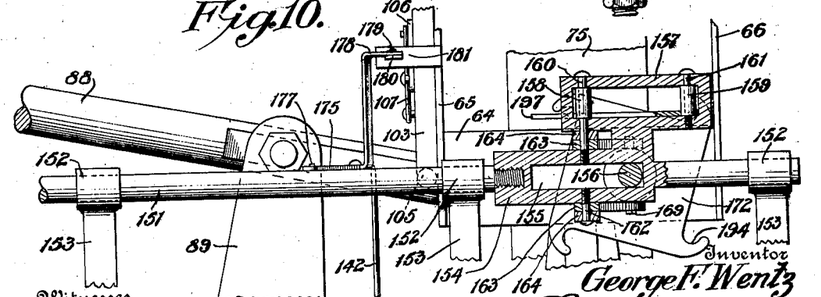
Figure 10 is a section taken substantially on the line 10—10 of Figure 9.

The bar 151 has an enlarged portion 154 which, as shown in Figure 10, is formed with a longitudinal slot 155 for receiving a plunger 156. A yoke 157 is integrally, or otherwise, secured to the enlarged portion 154 of the slide bar, and within the yoke, a pair of rollers 158 and 159 are mounted in spaced relation to each other on pins 160 and 161, respectively. The pin 160 extends downwardly into the upper part of the portion 154 of the slide bar, and in alinement with this pin in the lower side of the bar is a pin 162. Pivotally connected to each of the pins 160 and 162 is a toggle, consisting of links 163 and 164. The links 164 are pivotally connected at 165 to a collar 166, which is slidably mounted on the plunger 156, and an expansile coil spring 167 surrounds the plunger 156 between the collar 166 and lock nuts 168 secured to the outer end of the plunger. The toggles 163 are pivotally connected at 169 to a sleeve 170 slidably mounted on the plunger 156, and adapted to bear against the hub 171 of a wheel 172 which is secured to the plunger. The plunger extends through the bracket 64 into a hole 173 in the platen 80, through which the inner end of the plunger is adapted to be projected into contact with the tape 75 when the slide bar 151 is advanced to spread the toggles.

The inner end of the plunger 156 is so shaped as to make a distinctive impression upon the tape when it is advanced into contact therewith, that shown herein being in the form of two segments separated by a slot 174.

A bell crank 175 is pivotally mounted on an arm 176 extending laterally from the bracket 64, and the outer end of this bell crank has a slotted connection with a pin 177 on the slide bar 151. The inner arm of the bell crank is upwardly offset, as at 178, and has a slotted connection 179 with a ratchet bar 180, which is slidably mounted in flanges 181 extending outwardly from the side plate 65. The bar 180 is resilient, and its inner end 182 is curved upwardly and adapted to engage the teeth of the lower ratchet wheel 100, and is of such length that it will advance the tape 75 one space only after the slide bar 151 has been advanced until the toggle links 163 and 164 have passed dead center, so that the impression has been made by the plunger 156 and the latter retracted. It will be understood that the plunger 156 is retracted by a sudden motion, by means of the spring 167 after the toggle links pass dead center.

Figures 14, 15:
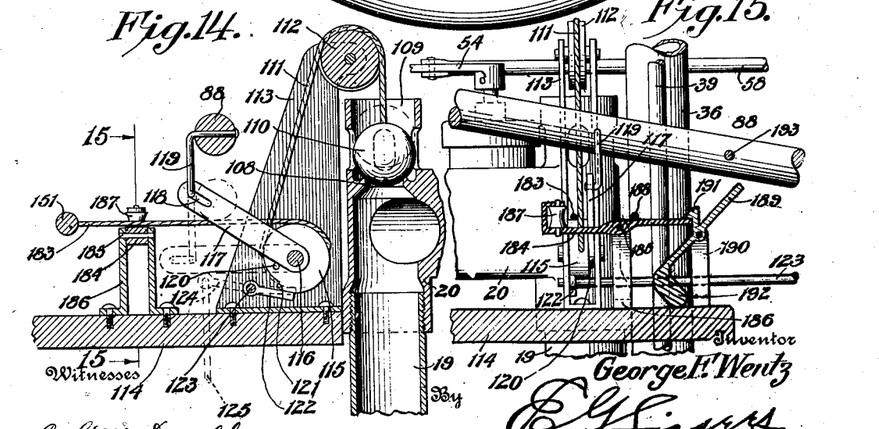
Figure 14 is a sectional view on an enlarged scale, and taken substantially on the line 14—14 of Figure 8.
Figure 15 is a section taken substantially on the line 15—15 of Figure 14.
Figure 16:
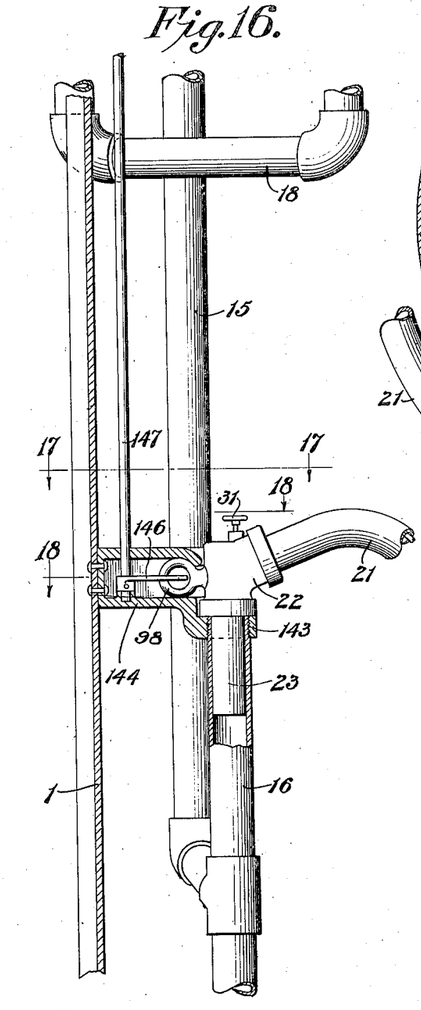
Figure 16 is a detail view, illustrating the operation of returning the contents of the visual container to underground storage.

After the slide bar 151 has been advanced to actuate the plunger 156, the nozzle 23 can not be removed from the stand pipe 16 until it has again swung to the left to bring the eye 98 into registry with the slot 145, and by so doing the slide bar 151 is retracted. During the retractive movement of the slide bar, the ball valve 110 is opened by means of a cable 183, one end of which is connected to the outer end of the slide bar 151, and the other end connected to the upper side of the sheave 115. Beneath the cable 183, as shown in Figures 8, 14 and 15, is an arm 184. This arm is intermediately pivoted at 185 to a bracket 186 secured to the raised portion 114 of the cover. One end of the arm 184 carries a roller 187, which is in front of the cable 183 when the arm is in horizontal position. A finger 188, secured to the outer end of the slide bar 151, extends over the arm 184, and is adapted to engage the same when the slide bar 151 is advanced, and to rock the arm to horizontal position. A gravity pawl 189 is pivotally mounted on a bracket 190 adjacent the inner end of the arm 184, and as the latter is swung to horizontal position, it is automatically engaged by a latch 191 extending upwardly from the pawl, the pawl being formed with a weighted lower end 192, which holds the latch in engagement with the arm until the pawl is positively actuated to release the same. In this position, as will be clearly understood upon reference to Figures 8, 14 and 15, when the slide bar 151 is retracted, the cable 183 is drawn about the roller 187 to open the ball valve 110, and no gasoline can be dispensed from the container 3 until the valve 110 is again closed. When the outer end of the lever 88 is pulled down, however, a finger 193, projecting laterally therefrom, engages the upper portion of the pawl 189 to rock the same and release the arm 184. The end of the arm which carries the roller 187, being heavier than the other end, immediately drops and releases the cable 183, providing sufficient slack to permit the valve 110 to close.

The wheel 172 is provided on its periphery with four equally spaced hook-shaped projections 194. The upper toggle link 164 is extended beyond the pivot 165, as shown at 195, and its extremity is pivotally connected, as at 196 to the rear end of a curved arm 197, which extends through the yoke 157 between the rollers 158 and 159, and in front of the wheel 172. As the slide bar 151 is advanced, the arm 197 is free to move away from the roller 159, but after the toggle links 163 and 164 have passed dead center, the roller 158 engages the concave side of the arm, and throws the extremity of the latter into engagement with one of the projections 194, and rotates the plunger 156 through an arc of 90° after it has been withdrawn from contact with the tape 75. As the slide bar 151 is being retracted, the roller 159, engaging the convex side of the arm 197, first moves the extremity of the latter away from the projection 194 along the flat side of the wheel, while a second impression is being made by the plunger, and then after the toggle links pass dead center, the plunger is suddenly retracted, and the arm 197, swinging about the roller 159 as a fulcrum, is restored to original position without again rotating the plunger.

Figure 13:
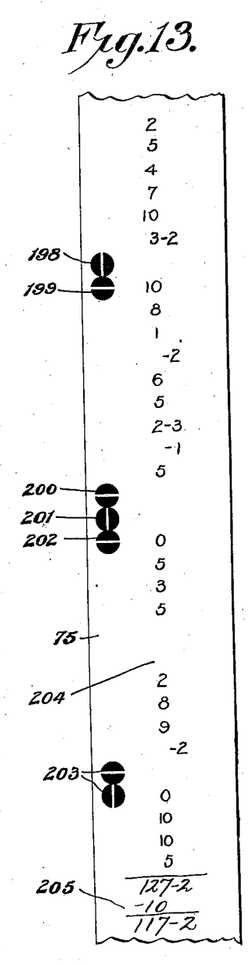
Figure 13 is a plan view of a portion of the record tape.

Figure 13 serves to illustrate a record which may appear upon the tape 75, each individual sale being recorded. At 198 appears the imprint which is made when the nozzle 23 is inserted in the stand pipe 16, and turned toward the right. At 199 appears the imprint which is made when the nozzle is withdrawn, and opposite this last imprint appears the number 10, which indicates that ten gallons have been returned to underground storage. The same process of inserting and turning the nozzle 23 may also be used to indicate a change of shifts. In such case, the departing attendant makes the imprints 200 and 201. The new attendant also manipulates the nozzle in a like manner, and since the retraction of the slide bar 151 by the first attendant does not advance the tape, the first imprint made by the new attendant coincides with the imprint 201 made by the first attendant. The tape is then advanced another space, and the imprint 202 is made. The hose is now hung up, or the lever 88 otherwise actuated, and since no gasoline was returned to underground storage at this time, the figure 0 will be printed opposite the imprint 202.

If at the close of the day, or at any other time, the nozzle is used to actuate the plunger 156 without returning the contents of the container 3 to underground storage, making the imprints shown at 203, the figure 0 will be recorded opposite the latter. In case any sales are made without being recorded, the cam 127, when the container 3 is refilled, will cause the tape to be advanced through the medium of the ratchet bar 136, and a blank space will appear on the tape as shown at 204.

In checking up the total amount of sales for any given time, the amounts recorded on the tape are totalized, and the amount returned to underground storage is deducted, as indicated at 205. If the resulting amount does not check up with the amount recorded on the meter, the difference will represent the amount which the attendant has failed to record at the point 204 on the tape, and should be charged to the attendant in charge at that time. If the resultant amount found at 205 is more than that recorded on the meter, it shows that one or more sales have been recorded twice, and the difference should be credited to the attendant.

Figure 11:
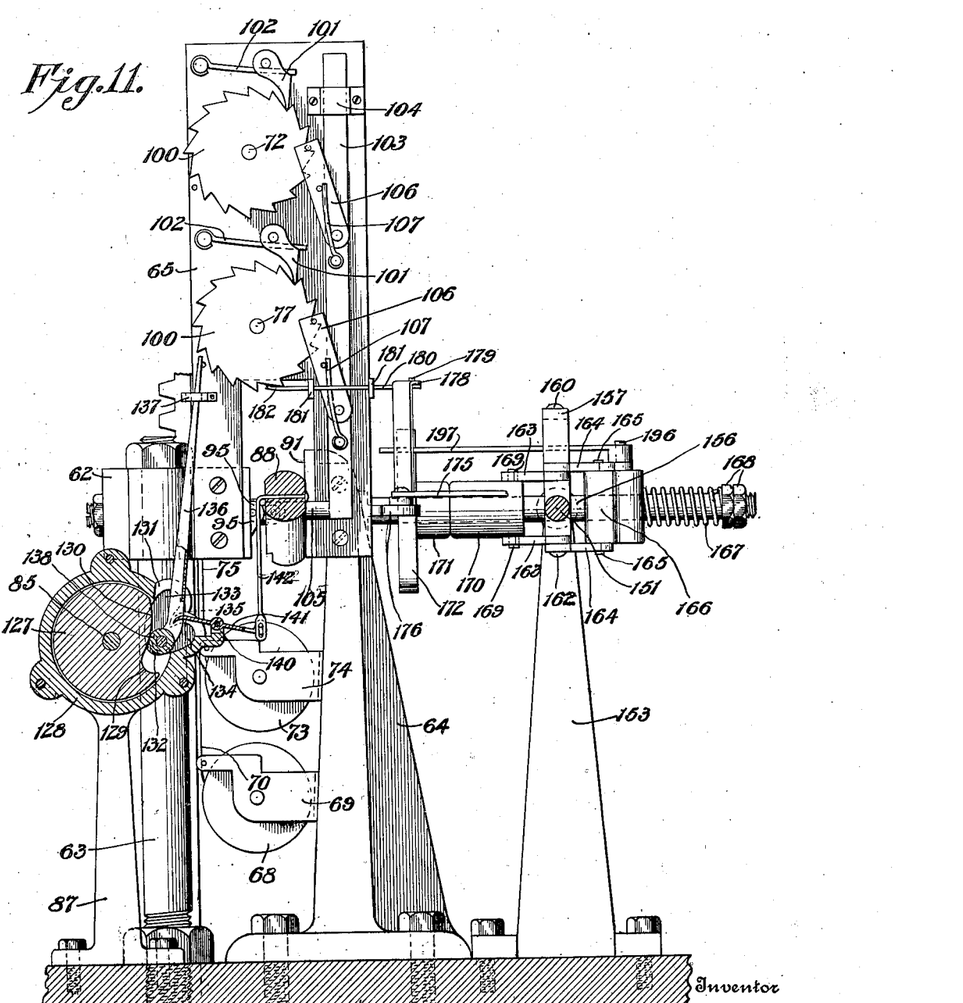
Figure 11 is a section taken substantially on the line 11—11 of Figure 9.

From the foregoing description, it will be understood that when gasoline is being withdrawn from the container 3, the float 59 moves downwardly, and by means of the rack 83 and pinion 84 rotates the cam 127 to the right, as viewed in Figure 11. The gearing is so arranged that for any position in which the gage may be set, the cam will come to rest with its cylindrical portion adjacent the roller 138, and with the latter underneath the curved end of the finger 141. Then, when the outer end of the main lever 88 is pulled down by the weight of the hose 21, or by other means, its bevelled inner end moves upwardly behind the roller 92, which advances the platen 80 to print on the tape 75 the amount of gasoline which has been withdrawn. At the same time the slide bar 103 is raised, so that each of the dogs 106 engages the next tooth of the corresponding ratchet wheel 100, and as soon as the outer end of the lever is released, it will be raised by the spring 99, the platen 80 will be withdrawn, the slide bar 103 will be lowered again, and the dogs 106 will advance the tape 75 and the inking ribbon 70 a distance of one space. When the outer end of the lever 88 is depressed, the curved end of the finger 141 engages the roller 138 holding the same out of the path of the notch 129 of the cam, so that the container 3 may be refilled, rotating the cam 127 to the left, as viewed in Figure 11, without advancing the tape.

In case, however, the container 3 is refilled without depressing the outer end of the lever 88 to record the previous sale, the first revolution of the cam will cause the notch 129 to engage the roller 138 to raise the ratchet bar 136 and advance the lower ratchet wheel 100 one notch, thereby advancing the tape, and causing a blank space to be left thereon. At each subsequent revolution of the cam, however, the convex portion 130 and the tongue 135 will cooperate to prevent the roller 138 dropping far enough for the ratchet bar 136 to engage another tooth, so that the tape will only be advanced one step during the refilling operation.

When the outer end of the lever 88 is pulled down and the sale recorded, the finger 119, depending from the lever, actuates the arm 117 to rock the sheave 115, on which the cable 111 is partially wound to raise the fall valve 110 and open the port 108. The latch finger 122 engages the shoulder 121 on the sheave 115, so that the port valve 110 remains open, destroying the vacuum in the discharge pipe 19, and making it impossible to dispense any more gasoline until the container 3 is refilled and the abutment 126 on the float 59 engages the lower end of the rod 125, lifting the same, and thereby disengaging the latch finger 122, and permitting the valve 110 to close when the lever 88 is released. When the main lever 88 is released, the tape 75 is advanced, and if the valve lever 54 is shifted to the proper position, gasoline may be withdrawn to the level previously determined by the position of the latch lever 42 on the gage bar 45, but after the lever 88 has been depressed, the valve 110 will remain open, so that no gasoline can be dispensed until the lever 88 is released and the tape advanced.

When closing for the night, the gasoline in the container 3 will usually be returned to underground storage. To do this, the gage is set at ten gallons, and the nozzle 23 is inserted in the stand pipe 16, and manipulated in the manner above described to advance the plunger 156 and make an imprint upon the tape to shown that the contents of the container has been emptied into underground storage, and not otherwise delivered. When the lever 88 is next actuated, therefore, prior to refilling, the number 10 will be printed on the tape opposite the last impression of the plunger 156.

Since the operation of dispensing the gasoline from the container 3 does not depend upon gravity, the container may be located as low as desired, so that the customer may conveniently observe the flow of gasoline therefrom, and see that he is getting the amount called for. The operation of the adjustable gage pipe 34 safeguards the customer, as well as the dealer, against losses due to carelessness on the part of the attendant. The delivery of a greater or smaller amount than is called for may be readily detected, and made a matter of record. The delivery of the gasoline is speeded up without sacrificing accuracy in the measurement of the same and delivery is automatically stopped when the exact amount has been dispensed. The amount of gasoline returned to storage is accurately measured, and the device makes a full and complete record of every transaction involved, so that either a failure to register a sale, or a duplicate registration thereof may be readily detected.

While I have described the invention as adapted for dispensing gasoline, it is obvious that it may be used for dispensing other liquids. It will also be understood that many modifications may be made in the detailed construction and arrangement of the various parts of the mechanism described without any material departure from the salient features of the invention as expressed in the appended claims.

What is claimed is:

1. In a liquid dispensing device, the combination of a container, an inlet passageway therefor, an outlet passageway leading from the bottom of the container to a higher point, a valve in each of said passageways, means for closing either valve while opening the other, a dispensing hose connected to the discharge passageway and terminating in a head having a nozzle, a converging mouth in said head behind said nozzle, and means for discharging compressed air through said mouth for creating a partial vacuum in the discharge passageway to draw liquid from the container and discharge the same through the nozzle.

2. In a liquid dispensing device, the combination of a transparent container, an inlet passageway therefor, an outlet passageway leading from the bottom of the container to a higher point, a dispensing nozzle connected with the discharge passageway, means associated with said nozzle for creating a partial vacuum in the discharge passageway to draw liquid from the container and discharge the same through the nozzle, and means for automatically breaking the vacuum as soon as the liquid in the container has been lowered to a predetermined level, said means including an adjustable inverted U shaped pipe.

3. In a liquid dispensing device, the combination of a container having an inlet passageway, an outlet passageway leading from the bottom of the container to a higher point, a dispensing hose connected to the discharge passageway and terminating in a head having a nozzle, an injector in said head behind the nozzle for creating a partial vacuum in the discharge passageway to draw liquid from the container and discharge the same through the nozzle, and means for automatically breaking the vacuum as soon as a predetermined amount of liquid has been removed from the container, said means including an inverted U shaped pipe.

4. In a liquid dispensing device, the combination of a container, an inlet passageway therefor, an outlet passageway leading from the bottom of the container to a higher point, a dispensing nozzle connected with the discharge passageway, means associated with said nozzle for creating a partial vacuum in the discharge passageway to draw liquid from the container and discharge the same through the nozzle, a vertically adjustable pipe in the shape of an inverted U with one leg extending through the top of the container and the other outside the same and in communication with the discharge passageway, whereby to break the vacuum in the latter when the level of the liquid in the container is lowered to the lower end of the first-mentioned leg.

5. In a liquid dispensing device, the combination of a container provided with an inlet passageway and an outlet passageway, means for dispensing a predetermined quantity of liquid from the latter, means for recording each amount dispensed, and means operated simultaneously with the actuation of the recording means to prevent dispensing of any more liquid until the container has been refilled.

6. In a liquid dispensing device, the combination of a container, an inlet passageway therefor, an outlet passageway leading from the bottom of the container to a higher point, a dispensing nozzle connected with the discharge passageway, means associated with said nozzle for creating a partial vacuum in the discharge passageway to draw liquid from the container and dispense the same through the nozzle, means for recording each amount dispensed, said discharge passageway having a port leading to the atmosphere, said port being normally closed, and means operated simultaneously with the actuation of the recording means to open said port and hold it open until the container has been refilled.

7. In a liquid dispensing device, the combination of a container, an inlet passageway therefor, an outlet passageway leading from the bottom of the container to a higher point, a flexible hose connected to the discharge passageway and terminating in a head having a nozzle, an ejector in said head behind the nozzle for creating a partial vacuum in the discharge passageway to draw liquid from the container and dispense the same through the nozzle, means to predetermine the amount of liquid to be dispensed, means for recording the amount thus dispensed, and means operated simultaneously with the actuation of the recording means to prevent the dispensation of any more liquid until the container has been refilled.

8. In a liquid dispensing device, the combination of a container having an inlet passageway, an outlet passageway leading from the bottom of the container to a higher point, a valve in each of said passageways, means for closing either valve while opening the other, a hose connected to the discharge passageway and terminating in a head having a nozzle, an ejector in said head behind the nozzle for creating a partial vacuum in the discharge passageway to draw liquid from the container and dispense the same through the nozzle, means for recording the amount so dispensed, and means operated simultaneously with the actuation of the recording means to prevent the formation of a vacuum in said passageway for the purpose of dispensing more liquid until the container has been refilled.

9. In a liquid dispensing device, the combination of a container, an inlet passageway, an outlet passageway leading from the container to a higher point, a dispensing nozzle connected with the passageway, means associated with said nozzle for creating a partial vacuum in the discharge passageway to draw liquid from the container and dispense the same through the nozzle, means for recording the amount so dispensed, said discharge passageway having a port leading to the atmosphere, a valve normally closing said port, means operable simultaneously with the actuation of the recording means to open the valve controlling said port, means for automatically latching the valve operating means to maintain said valve in open position so as to prevent the formation of the vacuum and prevent the dispensing of more liquid, and means automatically operated upon refilling the container to release the latching means and permit said valve to close.

10. In a liquid dispensing device, the combination of a container, an inlet passageway, an outlet passageway leading from the container to a higher point, a hose connected to the discharge passageway and terminating in a head having a nozzle, an ejector in said head behind the nozzle for creating a partial vacuum in the discharge passageway to draw liquid from the container and dispense the same through the nozzle, means for recording the amount so dispensed, said discharge passageway having a port leading to the atmosphere, a valve normally closing said port, means operable simultaneously with the actuation of the recording means to operate the valve to open said port, means for automatically latching the valve operating means to maintain said valve in open position so as to prevent the formation of a vacuum for the dispensing of more liquid, a float within the container, and means automatically operated thereby upon refilling the container to release the latching means and permit said last-mentioned valve to close.

In testimony, that I claim the foregoing as my own, I have hereto affixed my signature.

GEORGE FRANKLIN WENTZ.